United States Patent Office 3,262,972
Patented July 26, 1966

3,262,972
BROMINE CATALYZED ISOMERIZATION OF MALEIC ACID TO FUMARIC ACID IN THE PRESENCE OF A PEROXIDE
Robert S. Barker, Port Washington, N.Y., assignor to Halcon International, Inc., a corporation of Delaware
No Drawing. Filed Aug. 29, 1963, Ser. No. 305,547
6 Claims. (Cl. 260—537)

This application is a continuation-in-part of U.S. application Serial No. 41,008, filed July 6, 1960, and now abandoned.

This invention relates to a process for catalytically converting maleic acid to fumaric acid, and particularly to such a process wherein the catalyst is a bromine providing compound together with an oxidizing agent having an oxidizing strength over 1.23 volts.

Fumaric acid is a commercially valuable material which may be obtained by the isomerization of maleic acid at elevated temperatures or in the presence of certain catalytic materials. Even in the case where relatively pure aqueous maleic acid is used, known processes may give low quality fumaric acid. The art is confronted by the problem of providing a method for obtaining high quality fumaric acid in an economic and expeditious manner from aqueous maleic acid solutions.

By "bromine providing compound" is meant any soluble compound which, when in contact with the oxidizing agent, forms a mono or dioxy bromo complex. Examples of the broad classes of these compounds are: inorganic bromides wherein the bromine has a valance of −1; bromine; and N-bromoamides, acyl bromides and inorganic hypobromites wherein the bromine has a valance of +1.

Specific examples of the bromides include ammonium bromide, cadmium ammonium bromide, hydrogen bromide, manganese bromide, sodium bromide, and potassium bromide. N-bromoamides having the formula RCONHBr include N-bromosuccinimide, N-bromopropanamide. Acyl bromides having a formula RCOBr include acetyl bromide, propanoyl bromide and butanoyl bromide. The soluble inorganic hypobromite include the alkali metal and alkaline earth metal type such as sodium, potassium and calcium hypobromite. Nitrosyl bromide is still another example.

The "oxidizing agent" which may be employed include the soluble inorganic persulfates, hydrogen peroxide, and the soluble organic peroxides and hydroperoxides. The persulfates are preferably the ammonium or alkali or alkaline earth metal salts. Specifically, sodium persulfate, potassium persulfate, lithium persulfate, calcium persulfate, manganese persulfate are the most important examples. The organic peroxides include benzoyl peroxide, cyclohexanone peroxide, acetyl peroxide, lauroyl peroxide, and t-butyl peroxide. The hydroperoxides include cumene hydroperoxide, t-butyl hydroperoxide, Tetralin hydroperoxide, methyl ethyl ketone hydroperoxide and methylcyclohexane peroxide.

As a guide to the relative strength of oxidizing agents, reference is made to "Handbook of Chemistry" by N. A. Lange, 9th Ed., Handbook Publishers, Inc., Sandusky, Ohio (1956), pages 1212 to 1218, especially pages 1217 and 1218, showing a strength (volts) of 2.05 for the persulfate and 1.77 for hydrogen peroxide. For the chlorate, a strength of 1.23 is shown.

The reaction temperature is in the range of 50° C. to the boiling point of the solution under atmospheric pressure or higher temperatures if elevated pressure is used. Generally, the practical upper limit is 110° C., and a preferred range is 70 to 100° C. The reaction time is in the range of a one minute to one-half hour, even at the lower temperatures. Although, about 40% maleic acid solutions are preferred, other strengths, e.g., in the range of about 10 to 70% may be used. Even lower concentrations of maleic acid can be used but are not economically desirable.

If the maleic acid solutions are colored, they may be decolorized by the treatment with an oxygenated chlorine compound prior to the isomerization, e.g. sodium chlorate or hypochlorite (0.25% based on maleic acid). Alternatively, colored solutions may be decolorized by blowing with air at elevated temperatures with or without use of chlorate, hypochlorate, or other oxidizing agents. If the fumaric acid product is colored, it may be dissolved and decolorized, and reprecipitated, in known manner.

Based on the weight of maleic acid, the bromine content of the material may be present in an amount (calculated as ammonium bromide) in the range of 0.001 to 10.0%, desirable 0.01 to 5.0 and preferably 0.1 to 3.0. At the lower concentrations of bromine relatively higher temperatures are indicated. Higher amounts of bromine containing material may be used but are not preferred for both economic reasons and to avoid discoloration of the final product.

Based on the weight of maleic acid, the amount of oxidizing agent may be in the range of 0.003 to 10.0%, (i.e. on a molar basis of oxidant calculated as ammonium persulfate), desirably 0.1 to 5.0 and preferably 0.5 to 2.5%.

The standard used to indicate the quantity or intensity of color of the products in solution form is known as the APHA standard color test. This test is one developed by the American Public Health Associated which is known as the Hazen Platinum Cobalt Scale, a description of which is found on page 2048 of the 5th edition of "Standard Methods of Chemical Analysis by Wilford W. Scott.

In order to indicate still more fully the nature of the present invention, the following examples of typical procedures are set forth in which parts and percent mean part and percent by weight, respectively, unless otherwise indicated, it being understood that these examples are presented as illustrative only and are not intended to limit the scope of the invention.

Example 1

A reaction mixture is prepared from 20 ml. (parts by volume) of 40% aqueous maleic acid, by dissolving maleic acid, 40 gms. (parts) in water, 60 gms. (parts, previously boiled to remove dissolved oxygen and other gases) and mixed with 0.2 gm. (part) cadmium ammonium bromide and then warmed to 95° C., at which temperature 0.2 gm. (part) of ammonium persulfate is added. The reaction mixture starts to boil and precipitates white fumaric (APHA color of less than 10) acid in less than one minute. The conversion is essentially quantitative in up to 10 min.

Example 2

Following the procedure of Example 1, except using ammonium bromide instead of cadmium ammonium bromide (same amount of bromide), a similar precipitate and yield is obtained. The reaction, although slower, is complete in less than 40 minutes.

Example 3

Following the procedure of Example 1 except using 60 mgms. of the cadmium ammonium bromide and 1 ml. of hydrogen peroxide 3% aqueous, and holding the reaction mixture at 90° C., a similar result as to precipitate and yield is obtained; however the reaction is slower.

Example 4

Following the procedure of Example 3 except using 120 mgms. of cadmium ammonium bromide, similar results are obtained; and the reaction is somewhat faster than that of Example 3.

Example 5

Following the procedure of Example 3, except using 180 mgms. of cadmium ammonium bromide, similar results are obtained; and the reaction is somewhat faster than that of Example 4.

Example 6

Following the procedure of Example 3 except using 60 mgms. of ammonium bromide as the additive, similar results are obtained; however the reaction is much slower.

Example 7

Following the procedure of Example 3 except using 120 mgms. of ammonium bromide as the additive, similar results are obtained; however the reaction is slower.

Example 8

Following the procedure of Example 3 except using 180 mgms. of ammonium bromide as the additive, similar results are obtained; however the reaction is slower.

Example 9

Following the procedure of Example 1 except using a reaction temperature of 69° C., similar results are obtained; however, the reaction is somewhat slower.

Example 10

Following the procedure of Example 3 except using 120 mg. of bromine as the additive, similar results are obtained.

Example 11

Following the procedure of Example 1, except 0.2 g. of sodium hypobromite is used, similar yields are obtained; however, the reaction is somewhat slower.

Example 12

Following the procedure of Example 1, except 0.4 g. of N-bromosuccinimide is used. The reaction is completed in less than ten minutes.

Example 13

Following the procedure of Example 1, except using .3 g. of cumene hydroperoxide, essentially similar results are obtained.

The foregoing examples give white fumaric acid products (APHA color of not over 10). The rapid isomerization reaction rates permit high output for any given equipment size, with minimal, if any, by-product formation. The catalytic co-action of the combination is indeed marked, as compared to known catalysts, or the ingredients thereof used singly. In addition, these materials are economically desirable and readily available. Many materials including mineral acids such as nitric acid do not show such co-action with the bromine material.

In view of the foregoing disclosures, variations and modifications thereof will be apparent to one skilled in the art, and it is intended to include within the inventions all such variations and modifications except as do not come within the scope of the appended claims.

I claim:

1. A process for making fumaric acid which comprises: contacting an aqueous solution containing about 10 to 70 weight percent maleic acid with (1) from 0.001 to 10 weight percent based on maleic acid of a catalyst selected from the group consisting of soluble inorganic bromides; alkali and alkaline metals hypobromites; nitrosyl bromide; bromine; acetyl bromide, propanoyl bromide and butanoyl bromide; N-bromosuccinimide; N-bromopropanamide; and (2) from 0.003 to 10 weight percent based on maleic acid of an oxidizing agent selected from the group consisting of ammonium, alkali and alkaline earth metal persulfates; hydrogen peroxide; benzoyl peroxide, cyclohexanone peroxide, methylcyclohexane peroxide, acetyl peroxide, lauroyl peroxide and t-butyl peroxide; cumene hydroperoxide, t-butyl hydroperoxide, Tetralin hydroperoxide and methyl ethyl ketone hydroperoxide at a temperature between 50 and 110° C., thereby precipitating fumaric acid from said solution; and separating the precipitated fumaric acid.

2. The process of claim 1 wherein said catalyst is ammonium bromide and said oxidizing agent is ammonium persulfate.

3. The process of claim 1 wherein said catalyst is cadmium ammonium bromide and said oxidizing agent is ammonium persulfate.

4. The process of claim 1 wherein said catalyst is cadmium ammonium bromide and said oxidizing agent is hydrogen peroxide.

5. The process of claim 1 wherein said catalyst is sodium hypobromite and said oxidizing agent is ammonium persulfate.

6. The process of claim 1 wherein said catalyst is N-bromosuccinimide and said oxidizing agent is ammonium persulfate.

References Cited by the Examiner

UNITED STATES PATENTS

| | | | |
|---|---|---|---|
| 1,914,556 | 6/1933 | Conover | 260—537 |
| 2,790,827 | 4/1957 | Cummings et al. | 260—537 |
| 2,914,559 | 11/1959 | Stefaniak | 260—537 |
| 2,979,445 | 4/1961 | Lavigne et al. | 260—537 |

OTHER REFERENCES

Gould: Mechanism and Structure in Organic Chemistry, Holt, Rinehart and Winston, New York (1959), pp. 687–689.

Kharasch et al.: Journal of the American Chemical Society, vol. 59, p. 1155 (1937).

Mayo et al.: Chemical Reviews, vol. 27, pp. 351–412 (1940) (pp. 403–412 relied on).

Terry et al.: Journal of the American Chemical Society, vol. 47, pp. 1402–1412 (1925).

Wachholtz: Chemical Abstracts, vol. 22, p. 908, 3rd full paragraph (1928).

LORRAINE A. WEINBERGER, *Primary Examiner.*

LEON ZITVER, *Examiner.*

I. R. PELLMAN, *Assistant Examiner.*